(12) United States Patent
Van Dongen et al.

(10) Patent No.: US 7,597,067 B2
(45) Date of Patent: Oct. 6, 2009

(54) PROCESS TO REDUCE THE TEMPERATURE OF A HYDROGEN AND CARBON MONOXIDE CONTAINING GAS AND HEAT EXCHANGER FOR USE IN SAID PROCESS

(75) Inventors: Franciscus Gerardus Van Dongen, Amsterdam (NL); Winnifred De Graaf, Amsterdam (NL); Thian Hoey Tio, Amsterdam (NL); Anthonij Wolfert, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1092 days.

(21) Appl. No.: 10/493,328

(22) PCT Filed: Oct. 22, 2002

(86) PCT No.: PCT/EP02/11801

§ 371 (c)(1),
(2), (4) Date: Apr. 21, 2004

(87) PCT Pub. No.: WO03/036165

PCT Pub. Date: May 1, 2003

(65) Prior Publication Data

US 2004/0262579 A1    Dec. 30, 2004

(30) Foreign Application Priority Data

Oct. 22, 2001 (EP) ................... 01204009

(51) Int. Cl.
*F22B 37/04* (2006.01)
(52) U.S. Cl. ................................ 122/511
(58) Field of Classification Search .............. None
See application file for complete search history.

(56) References Cited

U.S. PATENT DOCUMENTS

| | | | |
|---|---|---|---|
| 488,513 A | 12/1892 | Anderson | |
| 2,820,437 A | 1/1958 | Ilune | 122/33 |
| 4,132,065 A | 1/1979 | McGann | 60/39.02 |
| 4,685,427 A | 8/1987 | Tassen et al. | 122/511 |
| 4,690,690 A | 9/1987 | Andrew et al. | 48/214 A |
| 6,242,112 B1 | 6/2001 | Forsberg et al. | 428/679 |

FOREIGN PATENT DOCUMENTS

| | | |
|---|---|---|
| DE | 199 26 402 | 11/2000 |
| DE | 100 28 824 | 12/2001 |
| EP | 0 168 892 | 1/1986 |
| EP | 0 257 719 | 3/1988 |
| EP | 0291111 | 11/1988 |
| EP | 0722999 | 7/1996 |
| EP | 0 819 775 | 1/1998 |
| EP | 1043084 | 10/2000 |
| WO | 95/31579 | 11/1995 |
| WO | 96/03345 | 2/1996 |
| WO | 96/39354 | 12/1996 |
| WO | 97/22547 | 6/1997 |

OTHER PUBLICATIONS

International Search Reported mailed Jun. 16, 2003.
Husemann R.U.: "Werkstoffe und Ihre Gebrauchseigen-Schaften Fuer Ueberhitzer-und Zwischen-Ueberhitzerrohre in Kraftwerken MIT Erhoehten Dampfparametern Teil 1: NEUE Ueberhitzerwerkstoffe, Betriebsversuche Hochtemperaturkor-rosionen", VGB Kraftwerkstechnik, pp. 84-87, vol. 79 Nr.9.

*Primary Examiner*—Yvonne L. Eyler
*Assistant Examiner*—Yevegeny Valenrod
(74) *Attorney, Agent, or Firm*—Charles W. Stewart

(57) ABSTRACT

A process to reduce the temperature of a hydrogen and carbon monoxide containing gas by contacting the gas with a metal alloy surface having a lower temperature than the temperature of the gas, wherein the metal alloy surface has between 0 and 20 wt % iron, between 0 and 5 wt % aluminium, between 0 and 5 wt % silicon, between 20 and 50 wt % chromium and at least 35 wt % nickel, wherein the metal alloy surface maintains it lower temperature than the temperature of the gas by making use of coolant water.

15 Claims, No Drawings

PROCESS TO REDUCE THE TEMPERATURE OF A HYDROGEN AND CARBON MONOXIDE CONTAINING GAS AND HEAT EXCHANGER FOR USE IN SAID PROCESS

The invention is directed to a process to reduce the temperature of a hydrogen and carbon monoxide containing gas by contacting the gas with a metal alloy surface having a lower temperature than the temperature of the gas.

Such a process is described in EP-A-257719. This publication describes a vessel comprising tubes through which a hot carbon monoxide and hydrogen containing gas flows. The gas is reduced in temperature because the temperature of the tube surface has a reduced temperature relative to the hot gas. The temperature of the tubes is kept at a lower value because the tubes are submerged in water. In the cooling process water will evaporate. By ensuring that fresh water is supplied to the vessel the temperature of the tubes can be kept at a lower temperature than the hot gas. The tubes are typically made from metal alloys comprising substantially of iron. Iron containing alloys are preferred because of their mechanical strength in combination with their relative low cost. Furthermore usage of these alloys makes it possible to manufacture the complicated tube structures of an apparatus as disclosed in EP-A-257719.

A disadvantage of the above apparatus is that in use coke will form on the interior surface of the tubes because part of the carbon monoxide reacts to carbon and carbon dioxide. Furthermore part of the surface will erode resulting eventually in an unacceptable low mechanical integrity of the tubes. These effects are especially significant when the amount of steam in the hot gas is below 50 vol %. Such a hot CO and $H_2$ containing gas is for example obtained when performing a partial oxidation of natural gas, refinery gas, methane and the like in the absence of added steam as described in WO-A-9639354.

It is the object of the present invention to provide a process to reduce the temperature of the hot gas wherein the above described problems such a coke formation and erosion are avoided or at least minimized.

This object is achieved with the following process. Process to reduce the temperature of a hydrogen and carbon monoxide containing gas by contacting the gas with a metal alloy surface having a lower temperature than the temperature of the gas, wherein the metal alloy surface comprises between 0 and 20 wt % iron, between 0 and 5 wt % aluminium, between 0 and 5 wt % silicon, between 20 and 50 wt % chromium and at least 35 wt % nickel, wherein the metal alloy surface maintains it lower temperature than the temperature of the gas by making use of coolant water.

Applicants found that coke formation and erosion can be reduced when the process according to the invention is used. Because the alloy layer, which contacts the hot gas, does not comprise a substantial amount of iron less coke formation and erosion is observed. A preferred support layer, which is not in direct contact with the hot gas, provides the mechanical strength to the metal alloy surface layer. This is advantageous because this feature makes it possible to construct for example the larger diamter tubes as in an apparatus according to EP-A-257719 in an economical manner.

The metal alloy surface layer comprises between 0 and 20 wt % and preferably between 0 and 7 wt % iron, preferably between 0 and 4 wt %, between 0 and 5 wt % aluminium, between 0 and 5 wt % silicon, between 20 and 50 wt % chromium, preferably between 30 and 50 wt % chromium, and at least 35 wt % nickel. The nickel content balances the total to 100%.

It has been found beneficial to have at least some aluminium and/or silicon in the metal alloy surface when the concentration of steam in the hot gas is lower than 50 vol %, preferably lower than 30 vol % and more preferably lower than 15 vol %. Preferably between 1-5 wt % aluminium and between 1-5 wt % silicon is present in said alloy layer under such low steam content conditions. The resulting aluminium oxide and silicon oxide layers will provide an improved protection against coke formation and erosion when the conditions become more reducing at such low steam concentrations. More preferably next to aluminium and silicon a small amount of titanium and/or REM (reactive elements) are added to the metal alloy. Examples of REM are $Y_2O_3$, $La_2O_3$, $CeO_2$, $ZrO_2$ and $HfO_2$. The total content of these added compounds is between 0 and 2 wt %.

Preferably the metal alloy surface layer is supported with a metal alloy support layer having better mechanical properties than said surface layer. The metal alloy support layer may be any metal alloy having the required mechanical strength for a particular application. Typically these metal alloys will contain more iron than the surface layer, suitably more than 7 wt % and even up to 98 wt %. Other suitable metals, which can be present in this metal alloy, are chromium, nickel and molybdenum. Examples of suitable metal allow support layers are carbon steels and so called low alloy steels having a typical Cr content of between 1-9 wt % and Mo content 0.1-2.25 wt %, austenitic stainless steels, for example the AISI 300 series (examples 304, 310, 316) with a typical Cr content of between 18-25% and Ni content of between 8-22%, cast materials, like for example HK-40, HP-40 and HP-modified, nickel based alloys, for example Inconel 600, Inconel 601, Inconel 690 and Incoloy 800 and ferritic stainless steels, which are Fe based alloys having a low nickel content, e.g. less than 2 wt % and a Cr content of above 12 wt %.

The two layers of metal alloys may be prepared by methods known to one skilled in the art. Preferably the metal alloy composite is made by means of a building-up welding method resulting in a weld-mounted multi-layered metal surface. This method is preferred because it enables one to make difficult tubular structures, as used in the heat exchanger, having the metal alloy surface according to the present invention. Such a method is characterized in that the desired metal alloy for use as the surface layer is first atomized by gas atomization to form a powder of said alloy. Preferably the iron content of said powder is substantially zero. A layer of the metal alloy is subsequently applied on the support metal alloy by built-up welding by plasma powder welding of said powder. After machining the weld metal a flat metal alloy surface is obtained. Thickness of the surface metal alloy may range suitably from 1 to 5 mm and preferably 1 to 3 mm. It has been found that the iron content in the metal alloy layer may contain iron in a situation wherein the starting powder did not contain iron. This is due to migration of iron from the support layer to the surface layer during the welding step. Care should be taken to limit the migration of iron to the surface layer such that the end iron content in the surface layer will be below 7 wt % and preferably below 4 wt %. The iron migration effect can be limited by using a low iron-content support layer, increasing the layer thickness and/or by applying the layer in more than one step. A preferred method to perform such a building-up welding method is described in EP-A-1043084, which publication is hereby incorporated by reference. This publication describes a method to obtain coke resistant furnace reactor tubes for a steam cracker process, which is aimed at preparing lower olefins, e.g. ethylene and propylene.

The gas is suitably obtained in a partial oxidation process of a hydrocarbon feedstock, for example coal, petroleum coke, residual refinery fractions, bituminous oils, such as ORIMULSION (trademark of Intevep S.A. Venezuela), natural gas, refinery gas, associated gas or (coal bed) methane and the like. In case a gaseous feedstock like natural gas is used the partial oxidation is preferably performed in the absence of significant amounts of added steam, and preferably in the absence of added steam, as moderator gas. The feedstock to the partial oxidation may also comprise recycle fractions comprising hydrocarbons and carbon dioxide as may be obtained in downstream processes which use the $CO/H_2$ containing gas as feedstock. An example of a suitable partial oxidation process is the so-called Shell Gasification Process as described in the Oil and Gas Journal, Sep. 6, 1971, pp 85-90. Publications describing examples of partial oxidation processes are U.S. Pat. No. 4,132,065, EP-A-291111, WO-A-9722547, WO-A-9639354 and WO-A-9603345.

The temperature of the hydrogen and carbon monoxide containing gas is preferably reduced from a temperature of between 1000 and 1500° C. to a temperature between 300 and 750° C. The hydrogen to CO molar ratio will depend on the feedstock of the partial oxidation process. For example when a solid or liquid feedstock is used an $H_2$ to CO molar ratio of the hot gas is preferably between 0.5 and 1.5. When the feedstock is a gaseous feedstock, like for example natural gas, this ratio is preferably between 1.6 and 2.5.

In case the feedstock of the partial oxidation is a solid hydrocarbon feed, for example coal or petroleum coke, the reduction of the temperature of the resulting hot gas according to the process of the present invention is preferably performed at the exterior of water cooled tubes as placed in a vessel. Examples of such heat exchanger vessels are described in EP-A-342767 and EP-A-722999.

In case the feedstock of the partial oxidation is a liquid or gaseous (at ambient conditions) hydrocarbon feed as described above the reduction of the temperature of the resulting hot gas according to the process of the present invention is preferably performed at the interior of a conduit. In such an embodiment the metal alloy surface maintains it lower temperature than the temperature of the gas in one by contacting the metal alloy support layer at its free side with coolant water as for example described in the afore mentioned EP-A-257719. In such an embodiment the gas is cooled by passing the gas through one or more conduits, which conduits are submerged in coolant water as contained in a vessel in which vessel steam is formed and discharged from said vessel and wherein the interior of the tubes consists of the metal alloy surface layer and the exterior of the tubes consist of the metal alloy support layer.

The invention is thus also related to a heat exchanger apparatus suited for lowering the temperature of a hot gas, comprising a vessel having a compartment for cooling water, an inlet for the gas to be cooled, an outlet for cooled gas, an outlet for heated steam and a collecting space for maintaining generated steam and at least one primary evaporator tube positioned in the compartment for cooling water and fluidly connected to the inlet for the gas to be cooled, and at least one steam tube for withdrawal of generated steam from the collecting space for maintaining generated steam and an inlet for fresh water, wherein the interior of the primary evaporator tube material consists of the above defined metal alloy surface and the exterior consists of the above defined metal alloy support layer.

Preferably the above apparatus may suitably comprise at least one secondary tube-shell heat exchanger vessel, which is used as 'super heater module'. Said extra vessel is positioned in the compartment for cooling water, such that the generated steam can be further heated against partially cooled gas from the primary evaporator tube. In this embodiment the term coolant water as used in the claims refers to water in the gaseous phase having a cooling capacity relative to the partially cooled gas. An example of such an apparatus is described in the above-mentioned EP-A-257719. More preferably the primary evaporator tube is fluidly connected to the tube side of the super heater module and the steam tube for withdrawal of generated steam is fluidly connected to the shell side of the super heater module.

The invention will be illustrated by the following non-limiting examples.

EXAMPLE 1

A gas mixture as produced in a partial oxidation of natural gas and having the properties as listed in Table 1 was contacted for 4000 hours and at about 600° C. with a metal alloy surface having the composition as listed in Table 2. The metal alloy surface was positioned on top of a support layer by the building-up welding method as described in EP-A-1043084. The support layer was a low alloy steel having the properties of the metal used in Comparative A (see Table 2). Visual inspection and mechanical inspection showed no deterioration of the metal alloy surface after 4000 hours. Furthermore no coke formation was observed.

TABLE 1

| | |
|---|---|
| CO | 33 (mol %) |
| $H_2$ | 55 |
| $H_2O$ | 7.5 |
| $CO_2$ | 4.5 |
| Soot | 50-100 ppm |

TABLE 2

| | Example | | |
|---|---|---|---|
| | 1 | 2 | Comparative A |
| Ni | 42 | 54 | |
| Cr | 39 | 25 | 1.0 |
| Al | — | 3 | |
| Fe | 15.5 | 16 | 97.85 (balance) |
| Ti | 0.2 | 0.2 | |
| Mo | 2.4 | 0.9 | 0.6 |
| Mn | 0.9 | 0.9 | 0.55 |

EXAMPLE 2

Example 1 was repeated except that a different metal alloy surface was used (See Table 2). The results were as in Example 1.

COMPARATIVE EXPERIMENT A

Example 1 was repeated except that a different metal alloy surface was used (See Table 2). In contrast to Examples 1 and 2 heavy coke formation was observed.

We claim:

1. A process to reduce the formation of coke and to reduce the temperature of a hydrogen and carbon monoxide containing gas obtained from the partial oxidation of a hydrocarbon feedstock by contacting the gas with a metal alloy surface having a lower temperature than the temperature of the gas, wherein the metal alloy surface comprises between 0 and 20 wt % iron, between 1 and 5 wt % aluminium, between 0 and 5 wt % silicon, more than 30 wt % chromium and at least 35 wt % nickel, wherein said alloy metal surface is maintained at a lower temperature than the temperature of the gas by making use of coolant water, and whereby coke formation on the metal alloy surface is minimized.

2. The process of claim 1, wherein the metal alloy surface comprises between 1 and 5 wt % silicon.

3. The process of claim 2, wherein the metal alloy surface comprises between 0 and 2 wt % titanium and/or REM.

4. The process of claim 3, wherein the metal alloy surface is supported with a metal alloy support layer having better mechanical properties than said surface layer.

5. The process of claim 4, wherein the metal alloy support layer comprises between 7 and 98 wt % iron.

6. The process of claim 5, wherein the metal alloy surface layer is applied to the metal alloy support layer by means of a build-up welding method.

7. The process of claim 6, wherein the temperature of the hydrogen and carbon monoxide containing gas is reduced from a temperature of between 1000 and 1500° C. to a temperature between 300 and 750° C.

8. The process of claim 7, wherein the hydrogen and carbon monoxide containing gas has a hydrogen to CO ratio of between 1.6 and 2.5.

9. The process of claim 8, wherein the gas comprises less than 15 vol % steam.

10. The process of claim 9, wherein the hydrocarbon feedstock to the partial oxidation process used to obtain the hydrogen and carbon monoxide containing gas is natural gas.

11. The process of claim 10, wherein the gas is cooled by passing the gas through one or more conduits, which conduits are submerged in coolant water as contained in a vessel in which vessel steam is formed and discharged from said vessel and wherein the interior of the tubes consists of the metal alloy surface layer and the exterior of the tubes consist of the metal alloy support layer.

12. The process of claim 1 wherein the metal alloy surface has a thickness of from 1 to 5 mm and has an iron content less than 7 wt %.

13. The process of claim of claim 2, wherein the hydrogen and carbon monoxide containing gas contains less than 30 vol % steam.

14. The process of claim 12 wherein the metal alloy surface layer has a thickness of from 1 to 3 mm and an iron content of less than 4 wt %.

15. A process to reduce the temperature of a hydrogen and carbon monoxide containing gas by contacting the gas with a metal alloy surface having a lower temperature than the temperature of the gas, wherein the metal alloy surface comprises between 0 and 20 wt % iron, between 1 and 5 wt % aluminium, between 1 and 5 wt % silicon, more than 30 wt % chromium and at least 35 wt % nickel, wherein said alloy metal surface is maintained at a lower temperature than the temperature of the gas by making use of coolant water.

* * * * *